Nov. 29, 1966   C. H. SAVIT ETAL   3,289,153
APPARATUS FOR COMPOSITING SEISMOGRAPHIC SIGNALS
Filed Jan. 27, 1964   6 Sheets-Sheet 1

FIG. 1.

CARL H. SAVIT,
THOMAS L. SLAVEN,
MELVIN J. WELLS,
    INVENTORS.
BY THEIR ATTORNEYS.
Spensley & Horn.

FIG. 2.

CARL H. SAVIT,
THOMAS L. SLAVEN,
MELVIN J. WELLS,
INVENTORS

BY THEIR ATTORNEYS

Spensley & Horn

FIG. 3.

CARL H. SAVIT,
THOMAS L. SLAVEN,
MELVIN J. WELLS,
INVENTORS.

By THEIR ATTORNEYS.
Spensley & Horn

Nov. 29, 1966  C. H. SAVIT ETAL  3,289,153

APPARATUS FOR COMPOSITING SEISMOGRAPHIC SIGNALS

Filed Jan. 27, 1964  6 Sheets-Sheet 6

CARL H. SAVIT,
THOMAS L. SLAVEN,
MELVIN J. WELLS,
INVENTORS.

BY THEIR ATTORNEYS.

Spensley & Horn.

3,289,153
**APPARATUS FOR COMPOSITING SEISMO-
GRAPHIC SIGNALS**
Carl H. Savit, Van Nuys, Melvin J. Wells, Torrance, and
Thomas L. Slaven, Los Angeles, Calif., assignors to
Western Geophysical Company of America, Los Angeles, Calif., a corporation of Delaware
Filed Jan. 27, 1964, Ser. No. 340,437
16 Claims. (Cl. 340—15.5)

This invention relates to seismic exploration and more particularly to an improved apparatus for seismic exploration of the type wherein a plurality of separate vibration records are added to obtain a composite meaningful result.

In making seismographic surveys, by the reflection method, information concerning earth formations is obtained by transmitting vibrations from a first point at or near the surface of the earth downwardly into the formations and measuring the reflected or refracted vibrations at one or more second points spaced along the earth's surface from the first point. The record of the earth's disturbance produced at the second point by a shock initiated near the earth's surface at the first point shows waves which have penetrated the earth and have been reflected by interfaces between two layers of different properties or characteristics. In many cases, several interfaces are present at varying depths and the record will show waves reflected from such interfaces. The amplitude of such reflected waves will vary over a considerable range depending upon the reflection co-efficient associated with each interface.

For example, in a common arrangement of seismographic exploratory and recording apparatus used for seismographic profiling work, a plurality of seismometer or detector groups are disposed in contact with the ground in a preferably straight line at opposite sides of the shock point. In order to produce the shock which will cause the disturbance it is common practice to utilize an explosive and to detonate the explosive at the shock point which is then referred to as the "shot point." A recording unit provided with suitable amplifying and recording means is electrically connected to the detectors to amplify and record the electrical impulse produced by the detectors upon the arrival at each detector group of seismic waves generated by the explosion at the shot point and reflected from the various underground formations.

The electrical impulses produced by the detector groups are recorded by multi-channel recording means such as drum-type magnetic tape recorders with a channel corresponding to each detector group. The detector signals are thus recorded on a time-scale record together with the instant of detonation. The signal corresponding to the instant of detonation is termed the "time break." The recorded information is then most generally corrected for various time scale differences which arise from the geometry of the field arrangement and the data are photographically reproduced to form a visual seismograph record.

Geographical areas vary greatly in reflection quality during seismographic exploration and in some areas or under certain circumstances the signal-to-noise ratio of the reflection signals is poor. That is, in some areas reflection quality is quite good so that it is easy for one skilled in the art to identify seismic events upon records prepared in those areas by the above techniques. In regions where reflection quality is poor, however, seismic records are difficult to interpret due to obscuring noise generated in near surface layers. Random waves, surface waves and multiple reflections received as near-surface reflections obscure correlation peaks in signal amplitude designating subsurface discontinuities and prevent their detection. Various methods have been developed in the prior art for increasing the signal-to-noise ratio by using a plurality of seismic detectors or geophones and combining the signals to produce a composite record. Various seismograph exploration methods have been developed for emphasizing the desired signal reflected from subsurface structures and reducing or minimizing the unwanted or random energy or noise. Such methods include horizontal stacking, vertical stacking, differential mixing and others wherein composite data is obtained by combining preselected portions of field data in predetermined relationships. For example, in the horizontal stacking method a number of explosive charges are detonated in succession with the shot-point and some of the seismometers being relocated between successive shots. Seismometer groups and shot points are paired such that for each pair energy propagated by each of several explosions travels a different path but is reflected from the same point or limited area on the subsurface bed.

Thus, if a first explosive charge is detonated in a first shot hole, seismic energy is propagated in all directions, and a part of this energy is reflected upwardly from a point or area on an interface to a first seismometer group spaced horizontally from the shot point. The shot point and seismometer group are then relocated relative to the first locations thereof, such that the energy transmitted from the shot point and reflected to the seismometer group is reflected from the same point or area on the interface. Accordingly the energy transmitted to the seismometer locations impinges on the subsurface bed at approximately the same point for both shots, and except for a possible difference in elapsed time between the instant of detonation and the instant of reception of the reflected energy, the received signals should correspond. Thus, when the received energy derived from the two shots is properly combined, the reflected energy will be reinforced whereas unwanted energy, being non-coincident will be de-emphasized and the signal-to-noise ratio of the record of signals received from that point on the interface will be enhanced. A specific and detailed illustration of a signal enhancement system will be described in detail in connection with the description of the apparatus of the present invention hereinafter.

The methods and apparatus for combining energy received from successive shots or for compositing signals in accordance with various methods varies widely. A composite record can be made with drafting instruments by algebraically summing the instantaneous amplitudes of the traces produced by separately recording the several shots in the conventional manner. Various types of machines are also available for the purpose. However, apparatus of the prior art is typically limited to a single method of compositing, is complicated in operation and has little flexibility of use.

The apparatus of the present invention is completely versatile, being capable of horizontal stacking, vertical stacking, differential mixing and all other processes involving compositing or transcribing of pluralities of seismic signals.

It is a primary object of the present invention to provide a seismographic recording apparatus wherein pluralities of signals can be readily composited or combined in any predetermined manner.

It is another object of the present invention to provide such compositing apparatus by which a predetermined system of compositing is performed by the apparatus with no possibility of operation in a manner incompatible with the particular operations necessary for the predetermined system.

Another object of the present invention is to provide improved automatic compositing apparatus for seismographic exploration wherein the composited signals are obtained quickly, efficiently, and without repeated read-out operations being performed on each field tape.

It is a further object of the present invention to provide a compositing apparatus for seismographic exploration installation of a single programmed patch board.

The present invention comprises a seismographic exploration compositing apparatus by which compositing can be accomplished in any predetermined program. The apparatus comprises, in general, a plurality of magnetic reproducing drums which are synchronously rotated. The first of the plurality of magnetic drums is equipped with dynamic and static correction means. The second magnetic drum is a synchronized transport adapted to receive and record simultaneously on sub-tracks the corrected data from the first drum such that the time breaks are in time-scale alignment. A plurality of field tape signals are recorded on sub-tracks of the second drum and the plurality of sub-tracks are read and transmitted from the second drum as a composite signal. A switching unit which includes a replaceable predetermined patch board selects the proper sub-tracks of the synchronizing drum dependent upon the system of compositing being employed.

The novel features which are believed to be characteristic of the invention, both as to its organization and method of operation, together with further objects and advantages thereof will be better understood from the following description considered in connection with the accompanying drawing in which a presently preferred embodiment of the invention is illustrated by way of example. It is to be expressly understood, however, that the drawing is for the purpose of illustration and description only, and is not intended as a definition of the limits of the invention.

Although not limited thereto, the present invention is particularly advantageous for compositing records formed by the method known in the art as the "horizontal stacking" or "common reflection point" method of seismic profiling and will, accordingly, be explained in connection with such a method as explanatory of the utility of the present invention. By the horizontal stacking method of seismic exploration, a plurality of seismic detectors or geophones are first positioned at equally spaced stations along a line on the earth's surface, a series of seimic shot points are located along the same line or a line parallel to the line of detectors, a shot is successively fired at each of the shot points, and the energy picked up by each of these detectors in response to each shot is recorded. After one or a few shots have been taken, the line of the geophone stations is advanced by transferring detectors from one end of the line to the other. Shots are initiated at additional points along the line and the wave energy detected at each of the geophone stations in response to these later shots is recorded. By continuing to extend the line of geophone stations and the line of shot points in this manner, data for a continuous multiple coverage profile based upon common depth points are obtained.

The number of geophone stations employed at any one time in practicing the horizontal stacking method may be varied widely. For purposes of illustration, however, a 24-station field operation will be considered. Twenty four geophone groups are thus located at equally spaced intervals along a line on the earth's surface. The line of shot points, is located adjacent to a line of geophone points preferably displaced a short distance transversely to avoid disturbances from falling debris. The shot points are not necessarily evenly spaced along the line, but a repeating pattern is used. The line of geophone points and the line of shot points are advanced in the same direction and in one direction only. For purposes of illustration, 300 percent horizontal stacking will be described in some detail hereinbelow. Three hundred percent horizontal stacking is shown schematically in FIGURE 2.

Figure 2:
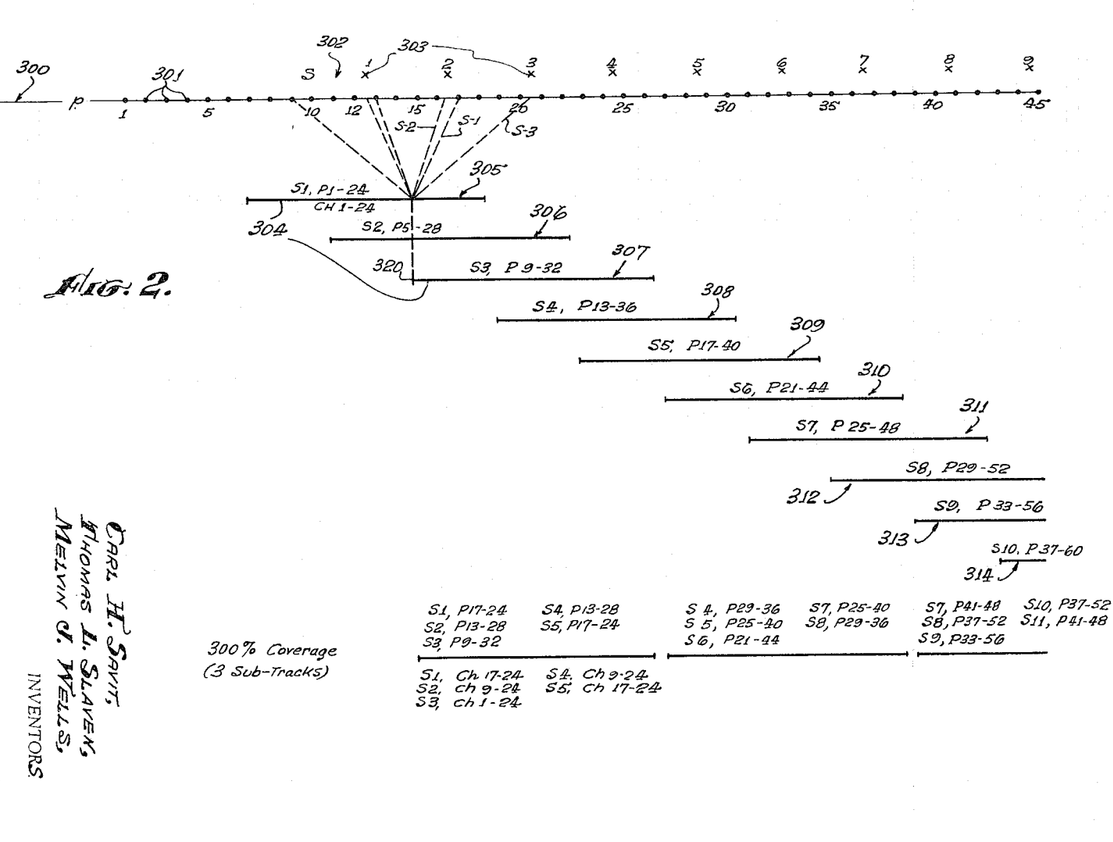
FIGURE 2 is a schematic view of a field set-up illustrative of the operation of the apparatus of the present invention.

At the top of the figure, a line 300 of detectors or "phones" 301 is shown in plan view together with a corresponding line 302 of shot points 303. The 'phones are numbered consecutively from left to right beginning with the number 1. It is understood that the line of 'phones is to continue indefinitely to the right. Similarly, the line of shot points 303 is consecutively numbered from left to right beginning with the number 1 and also continuing indefinitely to the right. In accordance with normal practice, shot point No. 1 is shown opposite the midpoint of the segment joining 'phone 12 and 13. That is, a 24-group 'phone cable is assumed to be used with the shot point placed symmetrically with respect thereto. Thus 'phone positions 1 through 24 are occupied during the taking of shot No. 1. Preparatory to taking of shot No. 2, 'phones are removed or deactivated in positions 1 through 4 and installed or activated in positions 25 through 28. Shot No. 2 is then taken opposite the midpoint of a 24-group spread extending from position 5 through 28. Upon completion of the shot at shot point 2, 'phones are deactivated or removed from positions 5 through 8 and activated or installed in positions 29 through 32. Shot point 3 is then occupied and the shot taken with the detectors occupying positions 9 through 32. This process is repeated progressively down the line of survey which comprises in combination the line of 'phones 300 and the line of shot points 302.

Below the plan view in FIGURE 2, segments 304 have been drawn representing the horizontal extent of the subsurface reflection points for each of the successive shots. The representation is conventional in that it is assumed that the reflection point produced by a given shot and detector is directly below the midpoint between said shot and said detector. That is, for convenience it is assumed that there is but one reflecting horizon below the surface of the ground and that that horizon is parallel to the surface.

While the line segments 304 are drawn parallel to each other and uniformly separated at intervals, this representation is to be understood as being purely for convenience, since all of these segments would, under the assumptions, be situated on one and the same line. In order, however, to be able to distinguish among the separate segments, they have been parallelly displaced from a common line and are plotted an echelon. Each of the line segments 304 thus represents the subsurface coverage for a separate shot. Thus the first line segment 305 represents the subsurface coverage of shot 1 received by 'phones 1 through 24. The second line segment 306 represents the subsurface coverage of shot 2 received by 'phones 5 through 28, and segment 307 represents the subsurface coverage of shot 3 received by 'phones 9 through 32, etc. It is thus clearly seen that any given point of subsurface coverage, after an initial point represented by the left end 320 of segment 307, has been obtained from precisely three different shots. For example, the left end point 320 of segment 307 represents subsurface coverage received by 'phone 17 on shot 1, 'phone 13 on shot 2, and 'phone 9 on shot 3.

At the bottom of FIGURE 2 are shown segments 321 representing 24-point 300 percent coverage zones resulting from the shooting hereinabove described. Conventionally, recordings such as magnetic tapes having 24 channels are produced which contain the combined reflections represented by these segments 321.

Each of these segments 320 is labeled to indicate the shot-'phone combinations which have been used to produce that segment. For example, the first segment 322 is comprised of data recorded from shots 1 through 5 as indicated. The letter S preceding a number indicates that that number represents a shot point. The letter P preceding a number or numbers indicates that those numbers represents 'phones. Thus segment 322 contains data recorded from 'phones 17 through 24 from shot 1, 'phones 13 through 28 from shot 2, 'phones 9 through 32 from shot 3, 'phones 13 through 28 from shot 4, 'phones 17 through 24 from shot 5.

After each shot, when the 'phones are relocated to the next position, the 'phones are also relocated relative to the field recording apparatus such that the signals from the first phone in the line 24 is recorded in channel 1 of the field tape recording apparatus. Thus, in connection with FIGURE 2, the signals received from phone locations 1 through 24 are recorded in channels 1 through 24; the signals from phone locations 5 through 28 are recorded in channels 1 through 24 respectively from the second shot; and so forth. Accordingly, the signals reflected from each of the segments 320 are recorded in channels 1 through 24 on successive field tapes and in connection with segments 321 representing the recording from successive subsurface refraction points the channels of the respective field tapes in which the signals from the indicated phones have been recorded are shown with the prefix Ch. Thus, in the first tape corresponding to the first shot the signal from phone 17 is recorded in channel 17 of the first tape, the signal from phone 13 on shot 2 is recorded in channel 9 of the second field tape and the signal from phone 9 on shot 3 is recorded in channel 1 of the third field tape.

Figure 1:
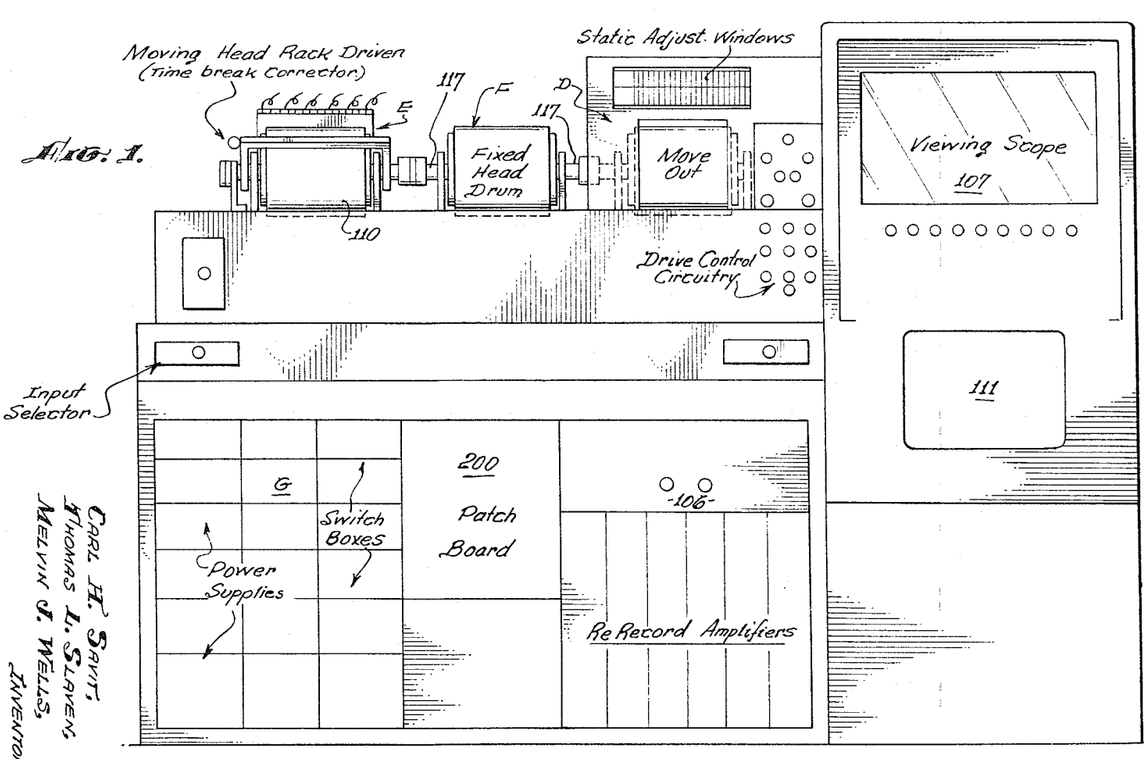
FIGURE 1 is a view in elevation of the assembled apparatus of the present invention.
Figure 3:
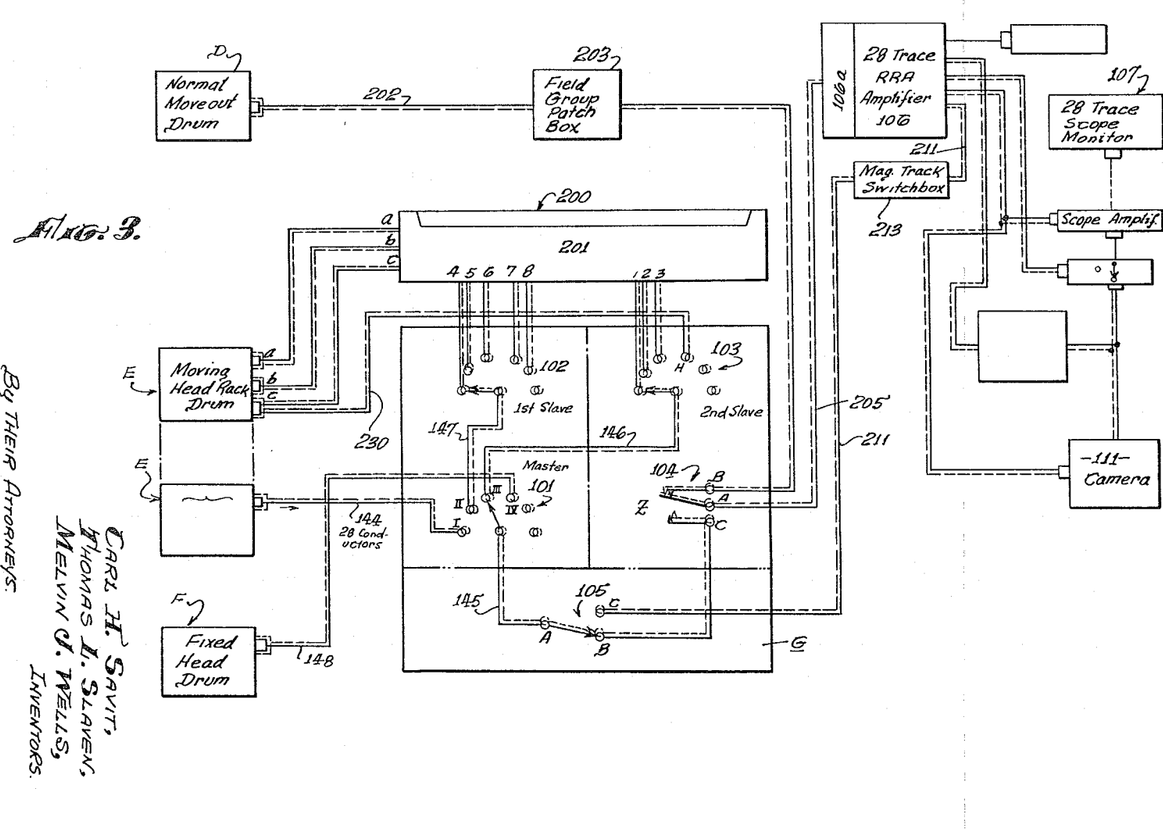
FIGURE 3 is a schematic flow sheet of the signal flow of the present invention.
Figure 4:
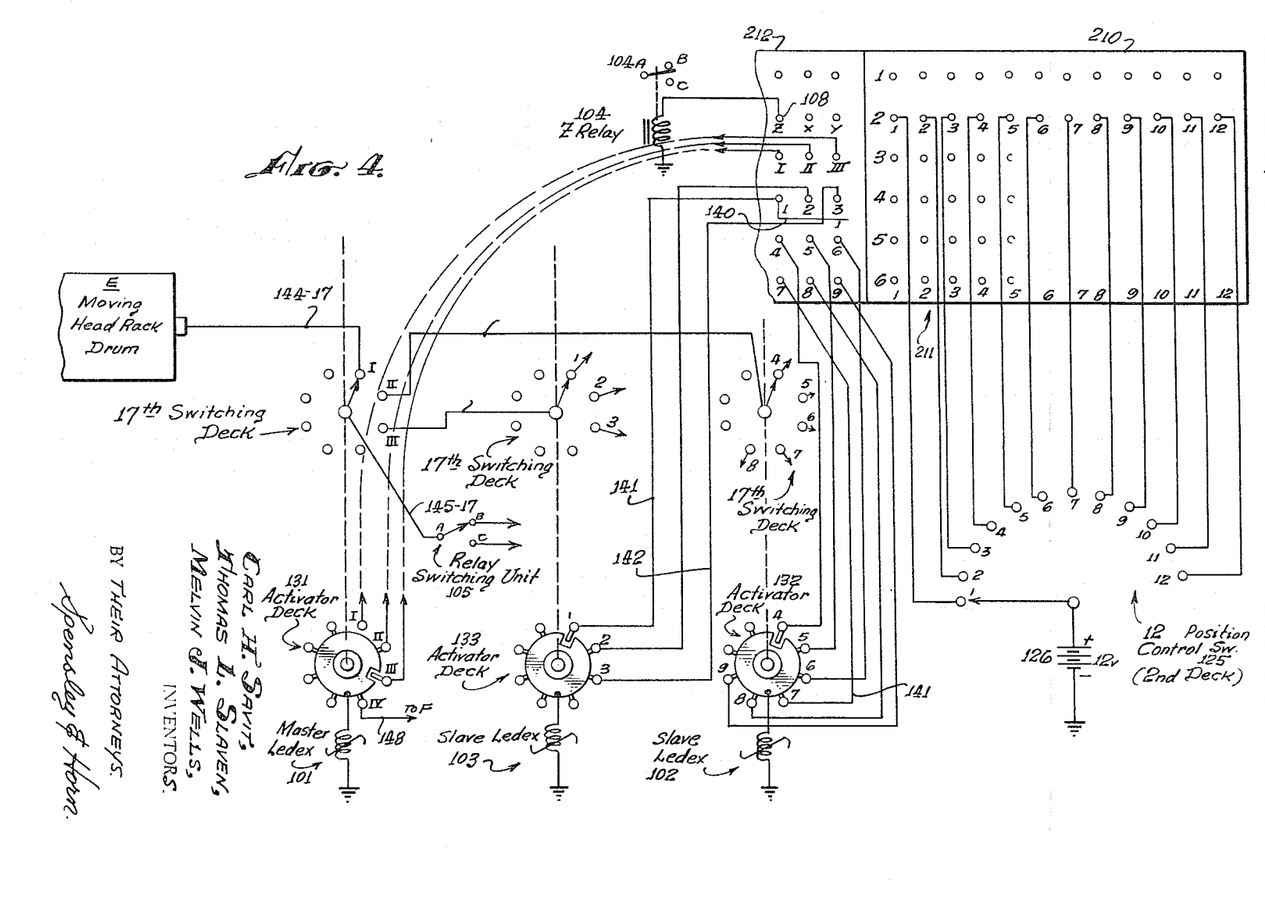
FIGURE 4 is a schematic flow sheet of the control functions of the apparatus of the present invention.

A complete description of the horizontal stacking method of seismic exploration is found in Patent No. 3,105,568, issued October 1, 1963 to R. N. Jolly, titled Seismic Profiling System. Referring now to FIGURES 1, 3 and 4, the apparatus of the present invention includes, in general terms, a normal-moveout tape drum D equipped with single track heads and an erase coil; a moving-headrack tape transport E equipped with three-track heads on the moving headrack and single track heads in a fixed head position; and a fixed head tape transport apparatus F equipped with single track heads and an erase coil. The tape transport drums D, E and F are mounted upon a common shaft 117, and driven at constant speed by a synchronous motor. A switching and compositing unit G comprises three five-position, 28 circuit homing switches, preferably of the well-known Ledex type, these three switches being identified by the reference numerals 101, 102 and 103, and two twenty-eight circuit relays 104 and 105. Also included in the present apparatus are a 28 trace re-record amplifiers 106, a 28 trace oscillographic scope 107; and a visual presentation camera 110 for visually reproducing the composited signals in the presentation form desired.

As pointed out hereinbefore the first tape transport unit D includes movable heads and associated apparatus for applying static and dynamic time-scale corrections to the field recorded tape. As is well known, it is necessary in order to composite a plurality of multichannel records, that the time-scale alignment of the signals in the various channels of the records be the same such that the tapes can be added with a common $T=0$ point of time reference. Further, it is necessary to apply time scale corrections to compensate for the varying horizontal distances of the detector groups from the shot point. That is, since the detector groups are at varying horizontal distances from the shot point and a greater time interval will be required for a reflected wave to reach the outermost detector group than the time interval which is required for the reflected wave to reach an innermost detector group from an interface the same vertical distance below each, move-out corrections are required. Thus, as the depth of the reflection increases the time differential required to reach the various detector groups becomes smaller with the time differential approaching zero as the depth of the reflection approaches infinity. In addition to the above move-out considerations, the various detector groups will in general be situated at various elevations so that it will be desirable to make time-scale adjustments to reduce all readings to a common horizontal plane. Similarly, origin adjustments of the time-scale are often necessary to compensate for varying amounts of near-surface weathered material under the different detector groups. The present invention utilizes static and dynamic time scale correction means similar to those described and shown in U.S. Patent No. 3,044,041 by Salvatori et al. issued July 10, 1962 titled Multi-Channel Recorder. Such time-scale correction means comprises for each channel a magnetic head which is mounted to be movable circumferentially with respect to the surface of the rotating drum. A flexible cable of fixed length is affixed to the head which is normally urged opposite the direction in which the cable extends. The cable extends over static correction means and thence to a dynamic calibration means. The static correction means provides variation of the origin point of the head by a predetermined amount. Variation of the origin is effected by varying the distance of the static correction means from the axis of the drum. Similarly the dynamic calibration means provides movement of the head in accordance with a predetermined function during rotation of the drum. The dynamic correction means includes a dynamic correction lever onto which are affixed a plurality of cables attached at one end of the movable heads in each channel of the head rack of the tape transport apparatus. The dynamic lever provides a plurality of affixing points to which the head cable for each channel is affixed. The distance from the pivot point of the lever arm at which each cable is affixed to the arm is determined by an appropriate mathematical function for each channel. The dynamic lever arm pivots about a pivot point in a plane substantially parallel to the plane of the cables and the lever arm is rotated through a predetermined angular distance at a predetermined rate. In the present embodiment the lever arm is moved at a rate determined by a dynamic function cam which defines a function $F(t)$.

The tape drum D is driven at constant speed together with tape drums E and F, by a synchronous motor not shown. Each of the drums is adapted for multi-channel magnetic recording in 28 channels, 24 of which are signal channels and four of which are auxiliary channels one of which includes the time-break signal. The second drum B termed the moving headrack drum is adapted to record three signals in each channel such that each principal channel contains three subchannels designated $a$, $b$ and $c$ (also termed subtracks $a$, $b$ and $c$). In order to add three signals in each channel to form a composite record having a single signal, it is essential that each of the recordings be commenced at the same time-scale position on the tape. That is, the $T=0$ or fiducial time point for each record must correspond to that of each of the previous recordings in order that a meaningful summation can be made. Thus, in twenty-four channels, each of the $a$, $b$ and $c$ recordings must be commenced at the same point on the recording drum. This is achieved by means of a moving headrack apparatus as disclosed and claimed in co-pending U.S. Patent application, Serial No. 220,720, filed August 31, 1962, by Carl H. Savit, et al. titled "Improved Time-Scale Recording Apparatus," now U.S. Patent No. 3,144,651. That is, as discussed hereinbefore and in greater detail hereinafter, there is recorded on each channel of tape transport E, three signals. There is transmitted from each channel of the drum E, a single signal which is the sum of the three signals recorded in that channel of the drum. In the presently preferred embodiment, a single recording head is used for each channel but is adapted to record three traces or signals in one channel. It is obvious that three heads could also be utilized rather than a single head with three parallel recording means. A single reading head then corresponds to the channel in which the three signals have been recorded such that when the reading head reads the signal in the channel, it automatically adds the three signals and transmits a single composite signal. The term "added," as used herein, should be understood to include averaging and the forming of linear combinations since it is necessary to maintain all signals within predetermined levels on the tapes. That is, it is undesirable to record signals at too low a level upon a magnetic tape by reason of the inherent background noise always present. Similarly it is undesirable to record at too high a level as distortion is produced thereby. Accordingly, it is customary in the art to base-level signals prior to addition and recordation. The exact parameters to be used in controlling gains and in recording added signals or individual signals are dependent upon the characteristics of the tapes, tape recorders and amplifiers to be used. They are, however, well known in the art of seismograph and magnetic tape recording.

Figure 6:
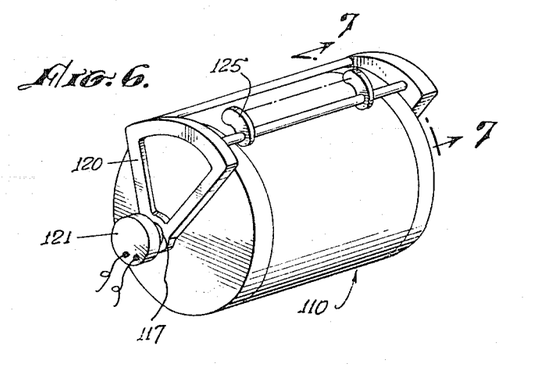
FIGURES 6 and 7 are partial views of the moving head rack drum of the present apparatus.
Figure 7:
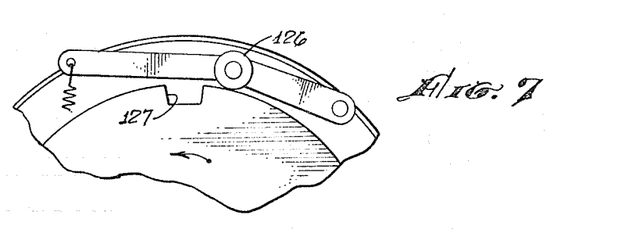

In order to align the $T=0$ point of each of the signals recorded in a subtrack of a channel on the tape transport drum, the drum is provided with a moving headrack and a magnetic brake, the construction of which is shown schematically in FIGURES 6 and 7 and generally includes a yoke 120 which spans the drum transversely and is rotatably mounted with respect to the shaft 117 at opposite sides of the drum 110 as shown particularly in FIGURES 6 and 7. The yoke carries the recording heads 125 in side-by-side relationship in their respective recording channels. Releasable engaging means are provided between the yoke and the drum. In the presently preferred embodiment the spring loaded detent 126 is used which engages a notch 127 in the outer end of the drum. The detent engaging arrangement is such that when the detent is in the notch the moving headrack will rotate with the drum and there will be no relative movement between the recording head and the recording surface. When the detent is so engaged the headrack is in the cocked position. A magnetic brake, 121, is positioned adjacent to the side of the drum 110 and is shown at 121 in FIGURE 6. The magnetic brake is so constructed and arranged that when energized to the braking position it instantaneously engages the moving headrack yoke and causes its rotation to stop immediately by interconnection with the frame or chassis of the drum apparatus. The magnetic brake is actuated by the time-break signal transmitted to the tape transport drum. Thus the drum B when initially rotated carries with it the moving headrack through a substantial arc. During this portion of the rotation cycle no recording occurs because there is no relative movement between the recording head and drum surface. At the instant of receipt of the time-break signal at the magnetic brake, however, the magnetic brake engages the yoke carrying the recording heads and holds it stationary while the drum continues to rotate and recordation is commenced. It can thus be seen that the commencement of recordation can always occur at the same position on the tape and that position corresponds in time to the time-break signal. This time-break signal is transmitted from the first drum D. Thus, in tape transport drum E three subtracks carrying three separate channels of signal data can be recorded either simultaneously or sequentially into the space on a magnetic tape normally occupied by a single track. When a tape so recorded is played back on a standard tape transport, the data recorded on the three subtracks is reproduced by a single playback head and thus composited.

The fixed head drum F is the drum which can receive and record in each channel the single composited signal or the signal produced by the moveout tape transport D. Thus, the fixed head drum E has 28 fixed recording heads each of which records a single signal in its respective channel. Accordingly, it can be seen that a field tape placed upon the move-out drum A has static and dynamic time-scale corrections applied thereto and transmits (by interconnection means to be described hereinafter) 24 channels of data and a time-break signal to the moving headrack drum where the 24 signals are recorded or can be recorded in the appropriate subtrack of the 24 channels on the moving headrack drum. Since the moving headrack drum has means for commencing signals received in the various subtracks at the same $T=0$ point, the signals can be recorded in the various subtracks and composited by single track reading heads associated with the tape transport drum E. These composite signals can then be transmitted to the oscillographic camera 111 for visual recordation or can be recorded in the appropriate channel of the fixed head tape transport drum C.

The present invention provides means for automatically predetermining which signals will be recorded in the various subtracks of the various channels of the moving headrack drum E for compositing. The apparatus of the present invention does this operation automatically and with continuity. As described more fully hereinafter, an essential element in the present invention which provides the means for determining the various signals to be recorded on the various subtracks of the tape transport E for compositing thereby, are the patchboard 200 together with the patchboard receiver 201, shown more particularly in FIGURE 5, which are connected to the switch case unit G.

Referring now to FIGURE 3, the signal flow sheet of the presently preferred embodiment of the present invention is shown. In FIGURE 3, the flow of a single signal is shown for purposes of clarity, it being understood that 24 signals plus timing and time-break signals flow along the same paths except where separated and reoriented at the patchboard as described hereinafter. In general terms, the 24 information channels and 4 auxiliary channels including the time-break channel are transmitted from the normal move-out drum along conductor path 202 to a field group patch plug box 203. The patch plug box is to allow reorientation of signals where necessary or to short the input of any transcribing amplifier if so desired for the purpose of eliminating that magnetic track. That is, if in the field set-up it was necessary, for example, to place the signal from detector 10 in a channel other than in channel 10, the signal can be changed to the channel 10 position through the patch plug box. The patch plug box is, in effect, nothing more than a set of disconnect points in which 28 male plugs can be inserted into 28 female receptacles to switch the signal transmitted from any one channel to any other desired channel by plugging the male plug corresponding to a particular channel transmitted from the normal move-out drum to a female receptacle corresponding to the channel in which the signal is to be oriented. Ordinarily the patch plug box is inactive and merely allows straight through transmission of the signals in the respective channels.

After passing through the patch plug box the signals progress to a two position record-reproduce-relay unit 104 which is a switch unit containing 14 four-pole relays to switch 28 two-conductor circuits to a record or reproduce orientation simultaneously. The relays utilized in the present preferred embodiment are 150 ohm, 12 volt relays of the type well known to the art. A single relay switch is shown in FIGURES 3 and 4 since all the circuits are routed simultaneously and similarily at this point. Thus when switch arm 104A is in contact with contact 104B, the apparatus is in a record position and the signals in all 28 channels are transmitted through the 28 relays along path 202 from the normal move-out drum and then are transmitted along cable 205 through an input attenuator unit 106a to a 28 trace rerecord amplifier 106. Through the amplifier 106, all the signals are amplified and transmitted to a monitor scope 107 and to an oscillographic camera 111 of the type well known to the art. The monitor scope can be any 28 trace reading scope of the type well known to the art and the oscillographic camera is a multichannel camera adapted to make a visual representation of the signals transmitted to each channel of the camera. Such camera may be for example, a dual display camera as described in Patent No. 3,107,137, assigned to the assignee of the present invention. The camera is equipped with a suitable switch for reproducing only when a record of the signals in the various channels is required. Thus, the signals in the various channels of the tape drum B transmitted to the amplifier 106 are continually presented to the monitor scope 107 and the oscillographic camera 111. The output signals from the amplifier 106 are also transmitted along cable 211 through a magnetic track switch box 213 to the switch case G. In passing to the switch case from the amplifier 106, the signals pass through the magnetic track switch box 213 which is adapted to reorient the time-break signal relative to the detector signals being transmitted. That is, in the normal course of seismographic exploration it is usual to orient the shot point at the midpoint of the various detectors or detector groups. When 24 detector groups are utilized the shot point is normally between the 12th and 13th detector in the field set-up. In various applications control of the exact position of the shot and detector cable may not be possible; as for example, in exploration over a body of water the shot point and/or cable may drift prior to detonation such that the shot position is no longer between the 12th and 13th detector group or so that the entire array is mislocated. The magnetic track switch box then contains circuitry necessary to redistribute the various detector signals among the circuit channels to compensate for the misplacement of the shot point or cable. The magnetic track switch box 213 is, for this purpose, capable of placing signals from groups 1 through 23 in channels 2 through 24, 1 through 22 in channels 3 through 24, 2 thru 24 in channels 1 through 23, etc. In other words, it is capable of advancing or retarding the channel positions of all signals by increments of 1, 2 or 3.

Upon passing into the switch case, the signals are routed to the relay switching unit 105 which is again a plurality of relays adapted to operate as a two position switch to pass the 28 channels of signals into a reproduce or record circuit configuration. For each channel there are two circuit paths and the relay switch 105A is movable into contact with contact 105C or 105B to complete the record or reproduce circuit. When the switch 105A is in contact with 105C, the apparatus is in the "record" condition and signals to the switch case from amplifier 106 are transmitted through circuitry as described hereinafter to the appropriate tape transport drum. When the switch 105A is in contact with the contact 105B the apparatus is in the reproduce configuration.

Figure 5:
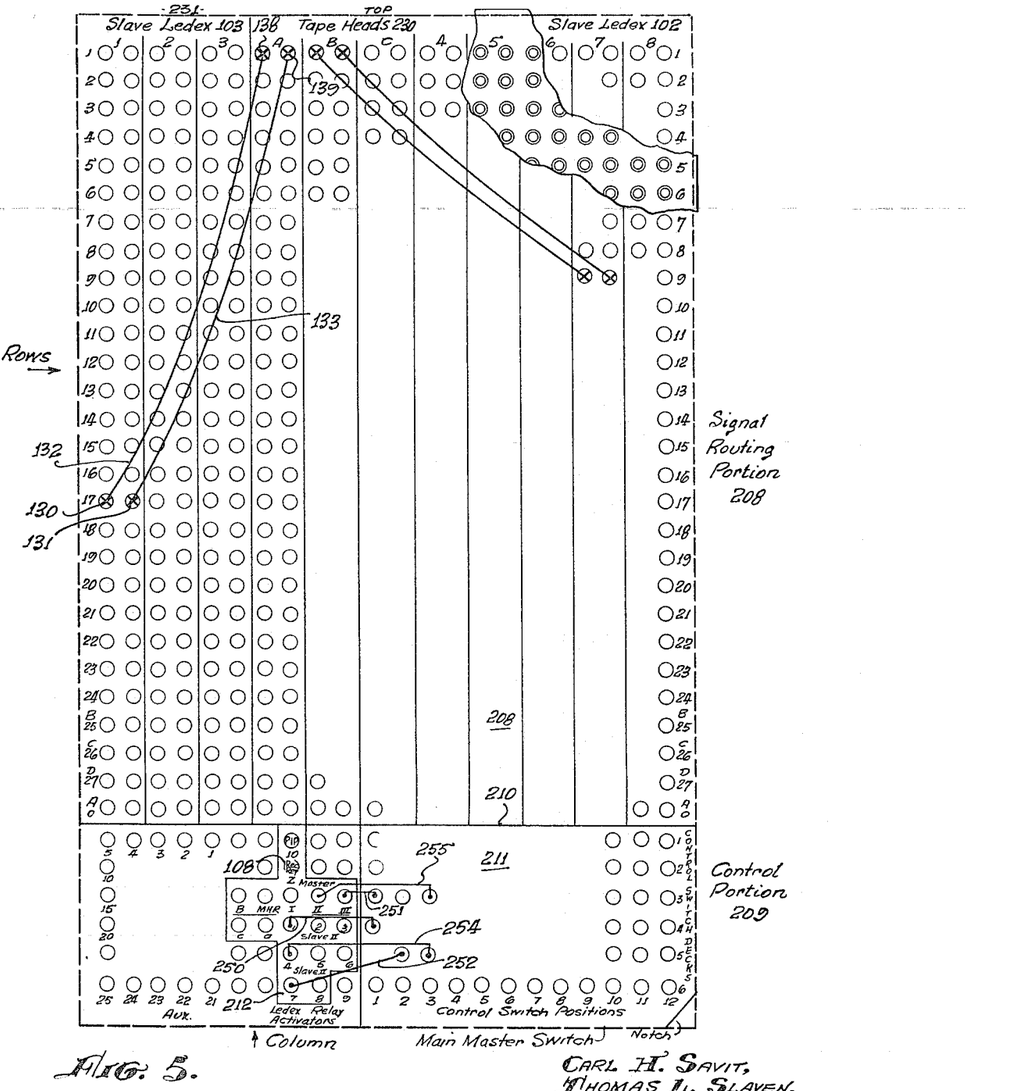
FIGURE 5 is a view in elevation of the patch board and patch board receiver of the present invention.

Referring now to FIGURES 3, 4 and 5 the signal routing and the control circuitry therefore are obtained in the present invention by means of a single patchboard and patchboard receiver. The patchboard is shown in FIGURE 5 with illustrative connections present. Physically, the patchboard is a sheet of electrically insulating rigid material with apertures therethrough in a predetermined pattern as shown in FIGURE 5. The patchboard receiver has a similar or mating pattern of contacts. Thus, as shown in FIGURE 5 a plurality of male plugs are positioned in the apertures with a portion of the plug extending through the board which portion is mateable with a female receptacle in the receiver portion as shown in FIGURE 5. The other end of the plug extends above the face of the patchboard for electrical connection to another plug. By connecting two of the plugs, an electrical circuit is made from the receptacle of the first plug to the receptacle of the second plug. In the illustrative patchboard and apparatus shown, twenty eight two wire circuits are connected between the terminals for each of eight positions of the two slave Ledex switches (identified as Ledex 102 and Ledex 103) and the patchboard receiver receptacles corresponding to the Ledex positions. The Ledex switches, in addition to an activator deck, have 28 switching decks so that each switching deck can be connected to one of the 28 rows in the patchboard. In the presently preferred embodiment it is necessary to utilize pairs of Ledex switches to obtain 28 switching decks. That is, two Ledex switches are ganged such that one switch controls 14 channels. However, for clarity of description each pair of Ledex switches will be considered hereinafter as a single 28 deck switch. Each position of the slave Ledex switches corresponds to a column in the patchboard receiver and each row of that column corresponds to a switching deck and then to a channel of signals passed in that position of the Ledex switch.

Thus, the electrical circuit conducting signals from channel 1 of tape transport D to the switch case G is connected from the first terminals of the first switching deck of the slave Ledex 103 when that switch is in position 1 to the patchboard receiver section 231 terminal pair labeled slave Ledex 103, column 1, row 1, while the circuit conducting signals from channel 2 is connected between the first terminal pair of the slave Ledex 103 second switching deck to the receiver portion 231, labeled slave Ledex 103, column 1, row 2, etc. Unless sufficiently heavy duty patchboard and patchboard receivers are utilized, it is necessary to pass the signals through power relays. The same 28 pairs of connections are also made between the second terminals through which the circuits are completed at position 2 of the slave Ledex switch 103 and the column labeled slave Ledex 103, column 2 in the patchboard receiver. Similarly, the 28 respective pairs of connections are made between the Ledex terminals for position 3 of slave Ledex 103 in section 231 and positions designated as 4 through 8 of slave Ledex 102 and the respective columns and rows of the patchboard receiver. Thus, if the master Ledex 101 and slave Ledexes 102 and 103 are in the positions where the signals are passed to one of the Ledex portion terminals the signals pass to the corresponding column and row of the patchboard receiver, i.e., in the illustrative position of the switches shown in FIGURES 3 and 4, the signals pass through the master Ledex switch 101 to the first slave Ledex 102, position 4, and the 28 signal channels are presented to the patchboard receiver at column 4, rows 1–28, respectively.

The block diagram of FIGURE 3 depicts the complete system, each of the interconnecting lines representing a 28 conductor cable to thereby provide twenty four information channels, two time-break channels and two auxiliary channels. The diagram of FIGURE 4 depicts the connections for only one of the twenty eight channels (the connections for the 17th channel being illustrated). A dash number is appended to the appropriate interconnecting leads of FIGURE 4 to provide correlation with the system block diagram of FIGURE 3. Thus, the interconnecting lead 147–17 in FIGURE 4 indicates the 17th channel lead of the 28-conductor cable 147 of FIGURE 3. One end of each of the twenty-eight leads of cable 147 is connected to terminal II of a different switching deck of the master Ledex switch 101, the other end of each of these twenty eight leads being connected to the movable arm of the corresponding switching deck of the slave Ledex switch 102.

In the embodiment shown in FIGURE 3, such connections are made between 3 positions of slave Ledex 102, which connections are so marked on the patchboard receiver. The subtracks of the tape heads in the moving headrack drum are connected to the patchboard receiver in columns corresponding to subtracks $a$, $b$ and $c$ for the 28 channels. Thus, circuits connect track $a$, channel 1 to column $a$, row 1, track $a$, channel 2 to column $a$, row 2, etc., track $b$, channel 1 to column $b$, row 1, track $c$, channel 1 to column $c$, row 1, etc. Accordingly, if the receptacles at column 7, row 9 are connected by a patch cord to those at column b, row 1, the signal presented at column 7, row 9, will be transmitted through the receptacles at column b, row 1, to the b track of channel 1 of the moving headrack tape drum B. In addition to the 24 channel rows in the patchboard, the 25th and 26th row in each of the columns will transmit the time-break channel while rows 27 and 28 are auxiliary.

That lower part of the patchboard and patchboard receiver below the line 210 defines the control circuitry portions 211 and 212 of the patchboard which are used to move the relays and Ledex switches to the necessary positions. That portion of the patchboard above the line 210 is the signal routing portion. Referring now to FIGURE 4, as discussed hereinbefore, signal switching operation of the apparatus of the present invention is controlled by one 12-position, 6-deck switch 125. The output voltage of a power supply 126 can be applied through the twelve position switch via power control relays to the activator decks of the three Ledex switches 101, 102 and 103, the coil of record-reproduce relay 104, the head pip indicator and to any other signal lights or operational apparatus desired to be activated or deactivated at specified positions of the selector switch. For purposes of illustration, however, only the second deck of the selector switch is shown to be connected to the control circuitry portion of the patchboard and the coil of the record-reproduce relay 104. Thus, in the patchboard receiver the plug receptacles are wired from the twelve receptacles in the row marked 1, in section 211 of the patchboard receiver to the twelve terminals on the first deck of the switch 125, the twelve receptacles in row 2 are connected to the twelve terminals on the second deck, etc. The receptacles in section 212 of the patchboard receiver are connected through appropriate contact relay circuitry to the apparatus to be voltage controlled. For example, receptacle 108 is wired to the coil of relay 104 such that upon passage of voltage through the receptacle 108 to the relay 104 is activated to the record position. Similarly, as shown in FIGURE 4, the terminals 130 of the activator decks 131, 132 and 133 respectively of the three Ledex switches 101, 102 and 103 are connected to individual receptacles so that, by the use of appropriate patch cords, the Ledex switches can be selectively operated to predetermined positions at predetermined positions of the selector switch. Thus, for example, if at position 1 of the selector switch 125, it is desired to move slave Ledex 103 to position 1, a connection is made by inserting one end of a patch cord 140 into the number 1 receptacle of patchboard receiver section 212 and the other end of the patch cord into a receptacle in the first column of patchboard receiver section 211. As shown in FIGURE 4, the patchboard receptacle number 1 in section 212 is wired by means of an electrical conductor 141 to terminal 1 of the activator deck 133 of slave Ledex 103 so that upon the application of the power supply voltage to receptacle number 1, the voltage will be applied to the Ledex control coil through terminal 1 of its activator deck and the Ledex will then automatically rotate to position 1. The automatic operation of Ledex type homing switches is well known in the art and hence will not be discussed in detail beyond mentioning that an electrical circuit to the Ledex motor coil is completed through the movable disc of the activator deck, this circuit being broken when the switch becomes positioned at the terminal to which the activating voltage is applied. As shown in FIGURE 4, connections are made between the appropriate terminal of the activator deck of each Ledex and the receptacle of the patchboard receiver labeled with the number of that terminal and the position which the switch will assume when voltage is applied to that receptacle and thus through the appropriate terminal to the control coil of the Ledex. The receptacles, terminals and positions of master Ledex 101 are indicated as I, II and III in FIGURES 3 and 4, those of Ledex 102 as 1, 2 and 3 and those of Ledex 103 as 4, 5, 6, 7 and 8.

The rows of apertures in section 211 of the patchboard receiver correspond to the decks of the selector switch while the columns correspond to the positions of the switch. The receptacles in section 211 in the receiver are connected to the terminal of the twelve position switch, 125 only the second deck switch connections being shown in FIGURE 4. Thus, in any position of the selector switch, circuits are completed to the receptacles corresponding to six decks of that position of the switch to apply voltage from the power supply 126 through the switch terminals. If a connection is made by means of a patch cord from a plug in the control switch section 211 of the patchboard to a plug in the Ledex activator section 212 of the patchboard the circuit is completed from the selector switch 125 through the connection between the plugs to the circuit which activates the function to be performed.

To illustrate the construction and operation of the present invention, an example of 300% roll-along composing will be considered. As discussed hereinbefore in connection with FIGURE 2, in order to obtain 300% compositing three signals from detectors which receive seismic signals from a common subsurface position but from different detectors or phones are added. In the example given it was seen that the data was received from a common reflection point at the seventeenth phone from the first shot point, the thirteenth phone from the second shot point and the ninth phone from the third shot point. Such data appears in channel 17 of the first field tape, channel 9 of the second field tape and channel 1 of the third field tape. Similarly, channel 18 of the first field tape, channel 10 of the second field tape and channel 2 of the third field tape contain the same data, as do channels 19, 11 and 3 of field tapes 1, 2 and 3 and so forth. To obtain 300% composited signals, it is necessary to add the channels of the various field tapes which contain the common informational data. In general terms, the apparatus of the present invention achieves 300% horizontal stacking in the example by transferring channels 17 through 24 on the first field tape from the normal moveout drum D, with static and dynamic corrections made, to the a subtracks of channels 1 through 8 of a composite tape on the moving head rack drum E. The time break is transferred onto the a subtrack of channel 25. Channels 9 through 24 of the second field tape are transferred onto the b subtracks of channels 1 through 16 of the composite tape on a moving headrack drum E. The time-break is transferred onto the b subtrack of channel 25 of the composite tape. Channels 1 through 24 of the third field tape are transferred onto the c subtracks of channels 1 through 24 of the composite tape while the time-break is transferred onto the c subtrack of channel 25. Channels 1 through 16 of the fourth field tape are transferred onto the a subtracks of channels 9 through 24 of the composite tape and the time-break is transferred onto the a subtrack of channel 26. Channels 1 through 8 of the fifth field tape are transferred onto the b subtracks of channels 17 through 24 of the composite tape, and the time-break is transferred onto the b subtrack of channel 26. Thus, when these transfers have been made, channel 1 of the composite tape will include channels 17, 9 and 1 of field tapes 1, 2 and 3, respectively, channel 2 will contain channels 18, 10 and 2 of the respective field tapes, channel 3 will contain channels 19, 11 and 3 of the respective field tapes, etc. The apparatus of the present invention carries out these operations by preprogramming the patchboard in the following manner and inserting the patchboard 200 into the patchboard receiver 201. Referring to FIGURE 5, two plugs 138, 139 are inserted into column labelled a of the tape head section 230 of the patchboard signal routing portion 203 at row 1. Two plugs are used for each position in order to accommodate a two-wire circuit connection between the various connecting points. In column labelled 1 of the patchboard section 231 corresponding to the positions of slave Ledex 103 at row 17, two plugs 130, 131 are positioned and two wire connections 132, 135 are made between the positions column *a*, row 1 and column 1, row 17. A circuit will thus be completed between the patchboard receiver slave Ledex 103 position 1, seventeenth circuit and the *a* subtrack of channel 1 tape head of the moving headrack drum E. Similarly, plugs are positioned in column *a*, row 2 and pitchboard section 231 corresponding to the positions of slave Ledex column 1, row 18 and connections are made. Connections are made similarly between tape head column *a*, row 3, and section 231 for slave Ledex 103, column 1, row 19, and so forth connecting tape head *a*, channels 1 through 8 with slave Ledex 103 circuits column 1, rows 17 through 24. In tape head column *b*, rows 1 through 16, plugs are inserted and connections are made to slave Ledex 102, column 7, rows 9 through 24. Slave Ledex 103, column 1, row 25 is also connected to tape head column *b*, row 25 is connected to slave Ledex column 7, row 25. Tape head column *c*, rows 1 through 25 are connected respectively to slave Ledex 102, column 4, rows 1 through 25. This series of connections can be omitted by a bypass operation as described hereinafter. Tape head column *a*, rows 9 through 24, are connected to slave Ledex 103, column 2, rows 1 through 16, and tape head column *a*, rows 9 through 24, are connected to slave Ledex 103, column 2, rows 1 through 16, and tape head column *a*, row 26 is connected to slave Ledex 103, row 25. Tape head column *b*, rows 1 through 8 are connected to slave Ledex column 8, rows 17 through 24, respectively. Tape head column *c*, row 26 is connected to Ledex 102, column 8, row 25. In order to allow monitoring of the subtracks in channels being recorded, additional connections are made as will be discussed hereinafter.

In the control section 211, 212 of the patchboard, single wire patch cords are inserted for single wire circuit connections between the following indication points:

Column 1, row 4, which indicates the fourth deck at position 1 of the twelve position control switch 125, in the control switch section 211, is connected by patch cord 250 to receptacle 1 in section 212, this receptacle being wired to terminal 1 of the activator deck of slave Ledex switch 103. In column 1, row 3, of section 211 connection is made by means of patch cord 251 to master Ledex 101, position III by plugging the patch cord 251 into receptacle 111 of section 212. In column 2, section 211, representing position 2 of the control switch 125, connection 252 is made between row 5, the fifth deck of the switch, and the aperture indicating position 7, the slave Ledex 102. In column 2, connection 253 is also made between row 3 and II of master Ledex 101. In column 3, connection 254 is made between row 5 of 211 and the aperture indicating position 4 of connection 255 between row 3 and II of the master Ledex. In column 4 of control switch 125 connection is made between row 4 and 2 of slave Ledex 102 and between row 3 and III of master Ledex. For clarity, further connections are not shown on the drawing. Column 5, row 5 is connected to 8 of slave Ledex 103, and row 3 is connected to II of master Ledex. In column 6, connection is made between row 4 and 3 of slave Ledex 102 and row 3 and III of master Ledex, as well as row 2 and 104 indicating relay 104. In column 7, row 5 is connected to 5 of slave Ledex 103, row 2 is connected to 104 for relay 104, row 3 is connected to II of master Ledex. Column 8, row 5 is connected to 6, row 3 is connected to II, row 2 is connected to 104. Column 9, row 3 is connected to I of master Ledex and row 2 is connected to 104. Column 10, row 3 is connected to B as is column 11.

With the above connections made between the positions on the patchboard, the patchboard is inserted into the patchboard receiver. By insertion of the patchboard all circuits above described are completed between the appropriate receptacles of the patchboard receiver. The first field tape is placed on the normal move-out drum D. Static and dynamic time-scale corrections are made as previously described. Referring to FIGURES 3, 4 and 5, the selector or control switch 125 is placed in position 1, and the control circuits are completed through column 1, row 3, of the patchboard, section 211 to the master Ledex position III, causing the master Ledex to assume position III as shown in FIGURES 3 and 4 by passing voltage from the power supply 126, through the position 1, deck 3 terminal of the control switch 125 to the receptacle of the patchboard receiver and through the patch cord 251 to the position III receptacle of the patchboard receiver, and thence to the activator deck of the master Ledex as described hereinbefore to rotate the Ledex 101 to the III position. Additionally, position 1 of the selector switch completes the circuits to position similarly, the second slave Ledex 103 at position 1 through patch cord 250. The record-reproduce relay 104 is in the record configuration with the switch arm in contact with contact B. The switching unit relay 105, is also moved manually to the record position with the switch arm in contact with contact C, which actuates the normal move-out drum to transmit the signals. The 24 information signals from channels 1 through 24 of the tape on the normal move-out drum plus the time-break signal in channel 25 are transmitted through the field group patch plug box 103 and transmitted to the record-reproduce relay 104 where the signals are routed to the re-record amplifier unit 106. The signals then pass through the magnetic track switchbox 213 to the relay switching unit 105, where they are passed through the switch arm from contact C to the master Ledex switch 101. Since the master Ledex switch 101 is in position III, the signals are then routed along the plural conductor 146 to the second slave Ledex 103 which is in position 1. The signals are thus transmitted to the receptacles in the patchboard receiver at column labelled 1 of section 231 which is the slave Ledex 103 section of the signal routing portion of the patchboard. The signals thus appear respectively in rows 1 through 24 and the time-break signal is in row 25 of column 1. As described hereinbefore, interconnections in the patchboard are made between rows 17 through 24 of the slave Ledex 103 section, column 1, to the tape head section, column labelled *a*, rows 1 through 8 and the 25th row of column 1 is connected to the 25th row of column *a*. These signals introduced at receptacles 17 through 25 are then transmitted to the moving head rack drum E, channels 1 through 8 and the time-break is transmitted to channel 25 of the moving head rack drum. Receipt of the time-break signal at the moving head rack drum causes the tape to be moved relative to the tape heads as described hereinbefore and the signals originating in channels 17 through 24 from the normal move-out drum are thus recorded in channels 1 through 8 of the moving head rack drum in subtrack *a* of those channels. During this recording step the signals are also presented to the 28 trace scope monitor 107 for visual monitoring of the recording step. The first field tape is then removed from the normal move out drum and the second field tape is mounted thereon. The selector switch is moved to position 2. Movement of the selector switch to position 2 completes all of the circuits in the second column of the selector switch section 211 of the patchboard. In position 2 of the selector switch circuits are completed to move the master Ledex to position II and the first slave Ledex to position 7. When the signals are transmitted from the normal move-out drum they are monitored visually and when it is ascertained that the transmission is normal and that the proper time-scale corrections have been introduced the relay switching unit 105 is moved to record position. The signals are then transmitted from the normal move-out drum as before through the re-record amplifier, the relay switching unit to the master Ledex and through the second position thereof along plural conductor 147 to the slave Ledex 102. The signals then pass through the circuits in the seventh position of the first slave Ledex 102 and are thus presented in column 7 of the patchboard receiver. The signals appear at rows 1 through 24 with a time-break appearing in row 25 of column 7 of the patchboard receiver. As described hereinbefore, column 7, rows 9 through 24 are interconnected with tape head column b, rows 1 through 16 and the time-break signal is connected to the 25th row of tape-head column b. Thus, when the signals are presented to the 7th column of the patchboard receiver the signals in channels 9 through 24 are transmitted to the b subtrack of channels 1 through 16 of the composite tape on the moving headrack drum and the time-break signal is transmitted to the b subtrack of channel 25. Again upon receipt of the time-break, the signals are recorded in these respective channels. The third field tape is then positioned on the normal move-out drum, static and dynamic time-scale corrections are introduced, the selector switch is moved to the third position, causing the master Ledex switch to be moved to position II and the first slave Ledex is moved to position 4. The 24 channels of information are respectively transferred to subtrack c in channels 1 through 24 respectively, of the moving head rack drum. The time-break signal is recorded upon subtrack c of channel 25. In this connection it can be seen that in this particular position of the selector switch the channels of information from the field tape are transmitted into the same channels of the composite tape but in subtrack c thereof. It can be seen therefore that a direct transfer of these channels can be made. This is accomplished in the present apparatus by utilizing position H of the second slave Ledex 103 as a by-pass connection. Position H of the second Ledex is then directly connected by cable 230 to the c subtrack of the moving head rack drum and thereby bypasses the patchboard. Thus, under certain circumstances a number of interconnections in the patchboard can be eliminated by the use of the direct bypass position. In this mode of operation the master Ledex would be moved to position III at the third position of the selector switch and the second slave Ledex 103 would be moved to position H. In position H the second slave Ledex transmits all signals directly to the c subtrack of the moving head rack drum such that the signals are recorded in the corresponding channel of the composite tape but in the c subtrack thereof. With the fourth field tape on the normal move out drum the selector switch is moved to position 4 moving the master Ledex to position III and the second slave Ledex to position 2. Channels 1 through 16 from the normal move out drum are thus transferred to column a, rows 9 through 24 and thus to subtrack a of channels 9 through 24 of the composite tape. In this position the time break is transmitted to the a subtrack of channel 26 of the composite tape. With the fifth field tape and the selector switch in position 5, the master Ledex is moved to position 2 and the first slave Ledex is moved to position 8 to thereby transfer channels 17 through 24 of the field tape to channels 1 through 8 of the composite tape of the b subtrack thereof. Accordingly after five recording operations the three subtracks and all channels of the composite tape are filled in the arrangement necessary for the compositing of the signals.

In position 6 of the selector switch the record-reproduce relay 104 is moved to the reproduce configuration wherein the switch arm is in contact with the C contact of the relay. In position 6 the master Ledex is moved to position III and the second slave Ledex is moved to position 3. The patchboard connections for position 3 of the second slave Ledex are such that the subtrack of channels 1 through 8 are connected to every third circuit of column 3 of the second slave Ledex connections.

Tape head row b channels 1 through 8 are also connected to the second slave Ledex position 3 connection in circuits 2, 5, 8, 11, 14, 17, 20 and 23 while the c subtracks of the first 8 channels in the tape heads are connected again to the slave Ledex position 3 at every third row thereof namely rows 3, 6, 9, 12, 15, 18, 21, 24. In position 6 the record-reproduce relay is moved to the reproduce configuration and the relay switching unit is left in its normally actuated position which is the reproduce position. In position 6 of the control switch the moving head rack drum E is in the read-out condition such that when operated the signals are transmitted from the subtracks of the composite tape through the patchboard receiver through the No. 3 position of the second slave Ledex, through position III of the master Ledex and through the relay switching unit, the record-reproduce relay and thence to the amplifier and to the scope monitor where they can visually be viewed for alignment and inspection.

In position 7 of the selector switch the connections are made through the patchboard and patchboard receiver between the 9th through the 16th channels the a subtrack to position 5 of the first slave Ledex in every third circuit, i.e., circuits 3, 6, 9, etc. The b subtracks of channels 9 through 16 are similarly connected to position 5 of the first slave Ledex at every third row thereof commencing with the first circuit, i.e., circuits 1, 4, 7, 10 etc.; while the c subtrack of channels 9 through 16 are connected to the position 5, circuits 2, 5, 8 etc. The operation of the apparatus in the 7th position of the selector switch is the same as the 6th position and allows visual monitoring of the subtracks in channels 9 through 16 of the composite tape. In position 8 the remaining subtracks are connected in a similar manner through position 6 of the first slave Ledex to allow visual monitoring of the channels 17 through 24.

When moved to position 9, the selector switch retains the record-reproduce relay in a reproduce position, moves the master slave Ledex to the I position and actuates the read-out circuitry by which the three subtracks in each channel of the moving head rack drum are read by a single head which thereby adds signals as described hereinbefore. The added signals are transmitted from the moving head rack drum as shown in FIGURE 3 through the plural conductor 144 to switch 101, the relay switching unit 105, the reproduce-record relay 104, the amplifier system 106, and thence to the oscillographic camera 111, where a visual presentation of the composite signals is recorded. Thus a composited visual record of the common reflection points from various detectors is obtained.

As shown in FIGURE 3, a fixed head recording drum F is included in the presently preferred embodiment of the present apparatus. The fixed head drum F is connected by plural conductors, shown by the representative conductor 149 in FIGURE 3 for a single channel, to a set of position terminals in the master Ledex which position is indicated as IV. The twelve position selector switch can then be connected as previously described to actuate the master Ledex to position IV at a predetermined position of the selector switch 125. When the master Ledex is actuated to position IV it can be seen by reference to FIGURE 3 that the signals in 28 conductors transmitted from the normal moveout drum D to the master Ledex are then conducted through the master Ledex 101 at position IV directly to the reproducing heads of the fixed head drum F for recordation thereby. Thus, it is possible at any time desired to transmit the time-scale corrected signals directly to the fixed head machine for storage thereon.

From the foregoing illustrative patchboard connections and description of sequence of operations, it can be seen by one skilled in the art that various compositing methods can be carried out by means of the apparatus of the present invention simply by inserting a pre-programmed patchboard in the patchboard receiver. The three Ledex switches and the relay for routing the signals from the channels of the normal moveout tape drum D to the receptacles of the patchboard receiver are all controlled by means of the circuit connections in the control portion of the patchboard while the programmed routing of signals is controlled by the connections in the signal routing portion of the patchboard. It is thus impossible for an operator to confuse the control and signal routing functions of the apparatus and it is only necessary for the operator to advance the control switch to automatically position the apparatus for the next sequence of operation. On each patchboard the correct sequence of switching functions and signal routing functions are predetermined for each step of the pre-programmed compositing method.

Although a 300% horizontal compositing operation has been described as illustrative, it will be apparent to those skilled in the art that the programming of the patchboard can be varied to achieve any compositing operation desired, such as 200%, 400%, 600% and 1200% horizontal stacking as well as other methods.

We claim:

1. Apparatus for combining preselected pluralities of seismographic signals comprising:
   reproduce means operative to reproduce a multichannel recording of time-variant signals,
   record means operative to record a multichannel recording of preselected pluralities of time-variant signals,
   time alignment means coacting with said record means to align indicial times of the individual signals comprising said composite time-variant signals,
   programable routing and control means acting to route signals from selected channels of said reproduce means for recordation and combination in selected channels of said reproduce means to said record means.

2. Apparatus for combining preselected pluralities of seismographic signals comprising:
   reproduce means operative to reproduce a multichannel recording of time-variant signals,
   record means operative to record a multichannel recording of preselected pluralities of time-variant signals in each channel thereof, time alignment means for aligning the $T=0$ time of each of said preselected pluralities,
   programable routing and control means acting to route signals from selected channels of said reproduce means for recordation and combination in selected channels of said record means and to control the selection of the routing of signals from said reproduce means to said record means, and, multichannel monitor means under control of said control means to monitor said multichannel time-variant signals.

3. Apparatus for combining preselected pluralities of seismographic signals comprising:
   reproduce means operative to reproduce a multichannel recording of time-variant signals,
   record means operative to record a multichannel recording of preselected pluralities of time-variant signals in each channel thereof, compositing means for adding said preselected signals in each of said channels,
   programable routing and control means acting to route signals from selected channels of said reproduce means for recordation and combination in selected channels of said record means and to control the selection of the routing of signals from said reproduce means to said record means.

4. Apparatus for combining preselected pluralities of seismographic signals comprising:
   reproduce means operative to reproduce a multichannel recording of preselected pluralities of time-variant signals in each channel thereof, means for compositing said preselected pluralities in each of said channels,
   programable routing and control means acting to route signals from selected channels of said reproduce means for recordation and compositing in selected channels of said record means and to control the selection of the routing of signals from said reproduce means to said record means, said control means including means for actuating said compositing means,
   switching means operative to actuate the control portion of said routing and control means thereby to permit an operator to select a specific mode of operation of said control portion.

5. Apparatus for combining preselected pluralities of seismographic signals comprising:
   reproduce means operative to reproduce a multichannel recording of time-variant signals,
   record means operative to record multichannel recording of preselected pluralities of time-variant signals in each channel thereof means for adding said preselected pluralities to form composite signals,
   time alignment means coacting with said record means to align indicial times of the individual signals comprising said composite time-variant signals, means for transmitting said composite signals for said record means,
   programable routing control means acting to route signals from selected channels of said reproduce means for recordation and combination in selected channels of said record means, and to control the selection of the routing of signals from said reproduce means to said record means.

6. Apparatus for combining preselected pluralities of time-variant signals comprising:
   a first multichannel recording apparatus of the type wherein signals recorded in the channels are transmitted as electrical signals;
   a second multichannel recording apparatus for recording signals transmitted from said first recording apparatus, means in association with said second recording apparatus for recording a plurality of signals in one informational channel and transmitting a single composite signal of said plurality;
   a patchboard receiver, circuit means for transmitting the signals in each of said channels of said first recording apparatus to a predetermined position on said patchboard receiver;
   circuit means for transmitting said signals from said patchboard receiver to said second recording apparatus;
   a preprogrammed patchboard connecting channels from said first recording apparatus to a predetermined channel of said second apparatus.

7. A seismographic compositing apparatus for combining seismic signals in a predetermined arrangement comprising:
   a first multichannel magnetic recording drum;
   a second multichannel magnetic recording drum, the second recording drum being adapted to record a plurality of signals in a single informational channel;
   means for transmitting a single composite signal from each of said informational channels;
   a patchboard receiver, means for selectively transmitting signals from each channel of said first drum to a prdetermined input position on said patchboard receiver, means connecting each of said channels of said second drum to predetermined output positions on said patchboard receiver;
   a patchboard insertable into engagement with said patchboard receiver, a plurality of connectors each one of said outputs when said patchboard is engaged with said patchboard receiver.

8. A seismographic compositing apparatus for combining seismic signals in a predetermined arrangement comprising:
   a first multichannel magnetic recording drum;
   a second multichannel magnetic recording drum, the second recording drum being adapted to record a plurality of successive seismographic signals in subtracks of a single informational channel, means for recording said successive signals in time scale alignment, means for transmitting a single composite signal from each of said informational channels;

a patchboard, means for selectively transmitting time-scale corrected signals from each channel of said first drum to a predetermined input position on said patchboard, means connecting each of said channels of said second drum to predetermined output positions on said patchboard;

a plurality of connectors each connecting a predetermined one of said inputs to a predetermined one of said outputs.

9. A seismographic compositing apparatus for combining seismic signals in a predetermined arrangement comprising:

a first multichannel magnetic recording drum;

a second multichannel magnetic recording drum, the second recording drum being adapted to record a plurality of successive seismographic signals in subtracks of a single information channel, means for recording said successive signals in time-scale alignment, means for transmitting a single composite signal from each of said informational channels;

a patchboard receiver, means for selectively transmitting time-scale corrected seismographic signals from each channel of said first drum to a predetermined input position on said patchboard receiver, means connecting each subtrack of each of said channels of said second drum to predetermined output positions on said patchboard receiver;

a patchboard insertable into engagement with said patchboard receiver, a plurality of connectors each connecting a predetermined one of said inputs to a predetermined one of said outputs when said patchboard is engaged with said patchboard receiver.

10. A seismographic compositing apparatus for combining predetermined seismic signals from a plurality of multichannel recordings comprising:

a first multichannel magnetic recording drum, said first recording drum including means for transmitting time-scale corrected signals from each channel of one of said plurality of recordings;

a second multichannel magnetic recording drum, said second recording drum being adapted to record a plurality of successive seismographic signals in respective subtracks of a single informational channel, means for recording said successive signals in time-scale alignment in said subtracks, means for adding the signals in said subtracks and transmitting a single composite signal from each of said informational channels;

a patchboard receiver, said receiver having a plurality of input positions to which each channel of said first drum can be selectively routed, means for selectively routing said time-scale corrected seismographic signal from each channel of said first drum to a predetermined one of said input positions, said receiver having an output position to which each subtrack of each of said channels of said second drum is connected;

control circuit means for selectively routing each of said channels to one of said input positions;

a patchboard insertable into engagement with said patchboard receiver, a plurality of connectors each connecting a predetermined one of said inputs to a predetermined one of said outputs when said patchboard is engaged with said patchboard receiver.

11. A seismographic compositing apparatus for combining predetermined seismic signals from a plurality of multichannel recordings comprising:

a first multichannel magnetic record drum, said first recording drum including means for transmitting time-scale corrected signals from each channel of one of said plurality of recordings;

a second multichannel magnetic recording drum, said second recording drum being adapted to record a plurality of successive seismographic signals in respective subtracks of a single informational channel, means for recording said successive signals in time-scale alignment in said subtracks, means for adding the signals in said subtracks and transmitting a single composite signal from each of said informational channels;

a patchboard receiver, said receiver having a plurality of input positions to which each channel of said first drum can be selectively routed, means for selectively routing said time-scale corrected seismographic signals from each channel of said first drum to a predetermined one of said input positions, said receiver having an output position to which each subtrack of each of said channels of said second drum is connected;

a multiple position signal conducting switch, connectors between each position terminals of said switch and one of said plurality of input positions of said patchboard to conduct the signal in each channel from said first drum to one of said input positions dependent upon the position of said switch;

a patchboard insertable into engagement with said patchboard receiver, a plurality of connectors each connecting a predetermined one of said inputs to a predetermined one of said outputs when said patchboard is engaged with said patchboard receiver.

12. A seismographic compositing apparatus for combining predetermined seismic signals from a plurality of multichannel recordings comprising:

a first multichannel magnetic recording drum, said first recording drum including means for transmitting time-scale corrected signals from each channel of one of said plurality of recordings;

a second multichannel magnetic recording drum, said second recording drum being adapted to record a plurality of successive seismographic signals in respective subtracks of a single informational channel, means for recording said successive signals in time-scale alignment in said subtracks, means for adding the signals in said subtracks and transmitting a single composite signal from each of said informational channels;

a patchboard receiver, said receiver having a plurality of input positions to which each channel of said first drum can be selectively routed, means for selectively routing said time-scale corrected seismographic signal from each channel of said first drum to a predetermined one of said input positions, said receiver having an output position to which each subtrack of each of said channels of said second drum is connected;

a signal conducting switch, said switch having a plurality of positions to which said switch can be actuated to conduct said signals from respective position terminals, connectors between each position terminal of said switch and one of said plurality of input positions of said patchboard to conduct the signal in each channel from said first drum to one of said input positions dependent upon the position of said switch;

a patchboard insertable into engagement with said patchboard receiver, a plurality of connectors each connecting a predetermined one of said inputs to a predetermined one of said outputs when said patchboard is engaged with said patchboard receiver.

13. A seismographic compositing apparatus for combining predetermined seismic signals from a plurality of multichannel recordings comprising:

a first multichannel magnetic recording drum, said first recording drum including means for transmitting time-scale corrected signals from each channel of one of said plurality of recordings;

a second multichannel magnetic recording drum, said
second recording drum being adapted to record a
plurality of successive seismographic signals in re-
spective subtracks of a single informational chan-
nel, means for recording said successive signals in
time-scale alignment in said subtracks, means for
adding the signals in said subtracks and transmitting
a single composite signal from each of said infor-
mational channels;
a patchboard receiver, said receiver having a plurality
of input positions to which each channel of said
first drum can be selectively routed, said receiver
having an output position to which each subtrack of
each of said channels of said second drum is con-
nected;
a signal conducting switch, said switch having a plu-
rality of positions to which said switch can be ac-
tuated to conduct said signals from respective posi-
tion terminals, connectors between each position ter-
minal of said switch and one of said plurality of
input positions of said patchboard to conduct the
signal in each channel from said first drum to one
of said input positions dependent upon the position
of said switch;
a patchboard insertable into engagement with said
patchboard receiver, a plurality of connectors each
connecting a predetermined one of said inputs to a
predetermnied one of said outputs when said patch-
board is engaged with said patchboard receiver;
means for reproducing said composite output signals
from said second drum;
connections between the terminals at an other posi-
tion of said switch and said second drum for trans-
mitting said composite signals from said second drum
through said switch at said other position to said
reproducing means.

14. A seismographic compositing apparatus for com-
bining predetermined seismic signals from a plurality of
multichannel recordings comprising:
a first multichannel magnetic recording drum, said
first recording drum including means for transmitting
time-scale corrected signals from each channel of
one of said plurality of recordings;
a second multichannel magnetic recording drum, said
second recording drum being adapted to record a
plurality of successive seismographic signals in re-
spective subtracks of a single informational chan-
nel, means for recording said successive signals in
time-scale alignment in said subtracks, means for
adding the signals in said subtracks and transmitting
a single composite signal from each of said infor-
mational channels;
a patchboard receiver, said receiver having a plurality
of input positions to which each channel of said
first drum can be selectively routed, means for se-
lectively routing said time-scale corrected seismo-
graphic signal from each channel of said first drum
to a predetermined one of said input positions, said
receiver having an output position to which each
subtrack of each of said channels of said second
drum is connected;
a signal conducting switch, said switch having a plu-
rality of positions to which said switch can be ac-
tuated to conduct said signals from respective posi-
tion terminals, connectors between each position
terminal of said switch and one of said plurality of
input positions of said patchboard to conduct the
signal in each channel from said first drum to one of
said input positions dependent upon the position of
said switch;
a patchboard insertable into engagement with said
patchboard receiver, a plurality of connectors each
connecting a predetermined one of said inputs to a
predetermined one of said outputs when said patch-
board is engaged with said patchboard receiver;
said patchboard receiver having a control section, a
multiposition selector switch operable to each posi-
tion, each position thereof having a plurality of
terminals through which voltage is conducted, con-
nectors between input positions of said control sec-
tion and terminals of said selector switch such that
voltage is applied to predetermined inputs at each
selected position of said selector switch, connectors
between output positions of said patchboard re-
ceiver and said signal conducting switch;
said patchboard having a plurality of connectors each
connecting a predetermined one of said control in-
puts to a predetermined one of said control outputs
when said patchboard is engaged with said patch-
board receiver.

15. A seismographic compositing apparatus for com-
bining predetermined seismic signals from a plurality of
multichannel recordings comprising:
a first multichannel magnetic recording drum, said
first recording drum including means for transmit-
ting time-scale corrected signals from each channel
of one of said plurality of recordings;
a second multichannel magnetic recording drum, said
second recording drum being adapted to record a
plurality of successive seismographic signals in re-
spective subtracks of a signal informational chan-
nel, means for recording said successive signals in
time-scale alignment in said subtracks, means for
adding the signals in said subtracks and transmitting
a single composite signal from each of said informa-
tional channels;
a patchboard receiver, said receiver having a plurality
of input positions to which each channel of said first
drum can be selectively routed, said receiver having
an output position to which each subtrack of each of
said channels of said second drum is connected;
a signal conducting switch, said switch having a plu-
rality of positions to which said switch can be actu-
ated to conduct said signals from respective position
terminals, connectors between each position terminal
of said switch and one of said plurality of input posi-
tions of said patchboard to conduct the signal in
each channel from said first drum to one of said in-
put positions dependent upon the position of said
switch;
a patchboard insertable into engagement with said
patchboard receiver, a plurality of connectors each
connecting a predetermined one of said inputs to a
predetermined one of said outputs when said patch-
board is engaged with said patchboard receiver;
means for reproducing said composite output signals
from said second drum;
connections between the terminals at an other position
of said switch and said second drum for transmitting
said composite signals from said second drum through
said switch at said other position to said reproducing
means;
said patchboard receiver having a control section, a
multiposition selector switch operable to each posi-
tion, each position thereof having a plurality of ter-
minals through which voltage is conducted, connec-
tors between input positions of said control section
and terminals of said selector switch such that volt-
age is applied to predetermined inputs at each se-
lected position of said selector switch, connectors
between output positions of said patchboard re-
ceiver and said signal conducting switch;
said patchboard having a plurality of connectors each
connecting a predetermined one of said control in-
puts to a predetermined one of said control out-
puts when said patchboard is engaged with said
patchboard receiver.

16. A seismographic compositing apparatus for com-
bining predetermined seismic signals from a plurality of
multichannel recordings comprising:

a first multichannel magnetic recording drum, said first recording drum including means for transmitting time-scale corrected signals from each channel of one of said plurality of recordings;

a second multichannel magnetic recording drum, said second recording drum being adapted to record a plurality of successive seismographic signals in respective subtracks of a single informational channel, means for recording said successive signals in time-scale alignment in said subtracks, means for adding the signals in said subtracks and transmitting a single composite signal from each of said informational channels;

a patchboard receiver, said patchboard receiver having a signal routing section and a control section, said routing section having a plurality of input receptacles to which the signal from each channel of said first drum can be selectively routed and an output receptacle to which each subtrack of each of said channels of said second drum is connected;

a signal conducting homing switch having a plurality of positions to which said switch can be actuated to conduct said signals from respective position terminals, connectors between each position terminal of said switch and one of said plurality of input receptacles to conduct the signal in each channel from said first drum to one of said input positions of said signal routing section dependent upon the position of said switch;

a manually operable multiposition selector switch, a power supply connected to said selector switch, said control section having a plurality of input receptacles, connectors between said selector switch and said plurality of control input receptacles to conduct voltage to predetermined ones of said control inputs dependent upon the position of said switch;

said control section having control output receptacles, circuit means connected between said control outputs and said homing switch for actuating said homing switch to a predetermined position upon application of voltage to said control output receptacle;

a pre-programmed patchboard insertable into engagement with said receiver and the receptacles thereof, a plurality of connectors in said signal routing section and control section each connecting a predetermined one of said inputs to a predetermined one of said outputs.

References Cited by the Examiner
UNITED STATES PATENTS

| | | | |
|---|---|---|---|
| 3,175,182 | 3/1965 | Woods | 340—15.5 |
| 3,210,770 | 10/1965 | Woods et al. | 346—33 |
| 3,223,967 | 12/1965 | Lash | 340—15.5 |

BENJAMIN A. BORCHELT, *Primary Examiner.*

SAMUEL FEINBERG, R. M. SKOLNIK,
*Assistant Examiners.*